(12) United States Patent
Gillen et al.

(10) Patent No.: US 10,214,059 B2
(45) Date of Patent: Feb. 26, 2019

(54) TIRE PRESSURE MANAGEMENT SYSTEM AND METHOD OF DECREASING TIRE PRESSURE

(71) Applicant: Dana Heavy Vehicle Systems Group, LLC, Maumee, OH (US)

(72) Inventors: Kurt P. Gillen, Perrysburg, OH (US); Jason M. Sidders, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 100 days.

(21) Appl. No.: 15/289,414

(22) Filed: Oct. 10, 2016

(65) Prior Publication Data

US 2017/0106705 A1 Apr. 20, 2017

Related U.S. Application Data

(60) Provisional application No. 62/242,408, filed on Oct. 16, 2015.

(51) Int. Cl.
*B60B 23/00* (2006.01)
*B60C 23/00* (2006.01)
*B60C 29/02* (2006.01)

(52) U.S. Cl.
CPC ............ *B60C 23/003* (2013.01); *B60C 29/02* (2013.01)

(58) Field of Classification Search
CPC .............................. B60C 23/003; B60C 29/02
USPC ........................................ 152/416, 417, 418
See application file for complete search history.

(56) References Cited

U.S. PATENT DOCUMENTS

| | | | |
|---|---|---|---|
| 3,456,676 | A | 7/1969 | Stuck |
| 3,489,166 | A | 1/1970 | Williams |
| 3,724,488 | A | 4/1973 | Featherstone |
| 3,747,626 | A | 7/1973 | Valentino |
| 3,789,867 | A | 2/1974 | Yabor |
| 4,171,119 | A | 10/1979 | Lamson |
| 4,269,223 | A | 5/1981 | Carter et al. |
| 4,431,043 | A | 2/1984 | Goodell et al. |
| 4,470,506 | A | 9/1984 | Goodell et al. |
| 4,480,580 | A | 11/1984 | Nalence |

(Continued)

FOREIGN PATENT DOCUMENTS

DE 2630511 1/1978
DE 2630511 A1 * 1/1978 ........... B60C 23/003

(Continued)

OTHER PUBLICATIONS

European Patent Office, International Search Report and Written Opinion issued in international application No. PCT/U2016/029156, dated Jun. 28, 2016, 10 pages.

*Primary Examiner* — S. Joseph Morano
*Assistant Examiner* — Jean W Charleston
(74) *Attorney, Agent, or Firm* — Marshall & Melhorn, LLC

(57) ABSTRACT

A tire pressure management system includes a control valve assembly. The control valve assembly directs pressurized air from a first fluid conduit when in a first position and provides fluid communication between a source of pressurized air and the first fluid conduit when in a second position. A deflate member is in fluid communication with the control valve assembly or the first fluid conduit. The deflate member includes an orifice having a constant cross-sectional area which is sized to maintain a predetermined pressure in a fluid control circuit.

17 Claims, 9 Drawing Sheets

(56) References Cited

U.S. PATENT DOCUMENTS

| | | |
|---|---|---|
| 4,641,698 A | 2/1987 | Bitonti |
| 4,678,017 A | 7/1987 | Schultz |
| 4,708,184 A | 11/1987 | Pechar |
| 4,744,399 A | 5/1988 | Magnuson et al. |
| 4,765,385 A | 8/1988 | McGeachy |
| 4,768,574 A | 9/1988 | Probst |
| 4,782,878 A | 11/1988 | Mittal |
| 4,848,391 A | 7/1989 | Miller et al. |
| 4,862,938 A | 9/1989 | Mittal |
| 4,895,199 A | 1/1990 | Magnuson et al. |
| 4,905,724 A | 3/1990 | Ranalletta |
| 4,905,742 A | 3/1990 | Mohs |
| 4,922,946 A | 5/1990 | Boulicault |
| 5,029,604 A | 7/1991 | Spektor et al. |
| 5,141,589 A | 8/1992 | Mittal |
| 5,181,977 A | 1/1993 | Gneiding et al. |
| 5,253,687 A | 10/1993 | Beverly et al. |
| 5,261,471 A | 11/1993 | Freigang et al. |
| 5,293,919 A | 3/1994 | Olney et al. |
| 5,309,969 A | 5/1994 | Mittal |
| 5,411,051 A | 5/1995 | Olney et al. |
| 5,413,159 A | 5/1995 | Olney et al. |
| 5,540,268 A * | 7/1996 | Mittal .................. B60C 23/003 152/415 |
| 5,544,688 A | 8/1996 | Freigang et al. |
| 5,587,698 A | 12/1996 | Genna |
| 5,647,927 A | 7/1997 | Mason |
| 5,713,386 A | 2/1998 | Heredia Batista et al. |
| 5,868,155 A | 2/1999 | Hutton |
| 5,927,337 A | 7/1999 | LaMantia |
| 6,142,168 A | 11/2000 | Sumrall |
| 6,209,350 B1 | 4/2001 | Kimble, III |
| 6,250,327 B1 | 6/2001 | Freigang et al. |
| 6,302,138 B1 | 10/2001 | Sumrall |
| 6,374,852 B1 | 4/2002 | Olivas |
| 6,427,714 B2 | 8/2002 | Freigang et al. |
| 6,561,017 B1 | 5/2003 | Claussen et al. |
| 6,604,414 B1 | 8/2003 | Claussen et al. |
| 6,634,375 B2 | 10/2003 | Olivas et al. |
| 6,758,088 B2 | 7/2004 | Claussen et al. |
| 6,865,930 B1 | 3/2005 | Claussen et al. |
| 6,868,719 B1 | 3/2005 | Claussen et al. |
| 6,880,598 B2 | 4/2005 | Haunhorst et al. |
| 6,943,673 B2 | 9/2005 | Skoff et al. |
| 7,032,611 B1 | 4/2006 | Sheng |
| 7,051,585 B2 | 5/2006 | Claussen et al. |
| 7,079,047 B2 | 7/2006 | Boulot |
| 7,188,638 B1 | 3/2007 | Peach |
| 7,191,796 B1 | 3/2007 | Rehmert, Jr. |
| 7,261,121 B2 | 8/2007 | Bordonaro et al. |
| 7,434,455 B2 | 10/2008 | Aiff |
| 7,437,920 B2 | 10/2008 | Beverly et al. |
| 7,686,051 B2 | 3/2010 | Medley et al. |
| RE41,756 E | 9/2010 | Claussen et al. |
| 7,857,173 B2 | 12/2010 | Bolyard, Jr. |
| 8,113,234 B2 | 2/2012 | Campau |
| 8,136,561 B2 | 3/2012 | Sandoni et al. |
| 8,256,447 B2 | 9/2012 | Badstue et al. |
| 8,307,868 B2 | 11/2012 | Medley et al. |
| 8,307,869 B2 | 11/2012 | Medley et al. |
| 8,356,620 B2 | 1/2013 | Colussi et al. |
| 8,596,560 B2 | 12/2013 | Morgan et al. |
| 8,844,596 B2 | 9/2014 | Medley et al. |
| 9,278,587 B2 | 3/2016 | Honig |
| 9,296,264 B2 | 3/2016 | Mozingo |
| 9,308,788 B2 | 4/2016 | Fazekas |
| 9,493,042 B2 | 11/2016 | Gillen |
| 9,573,428 B2 | 2/2017 | Sidders |
| 2002/0134428 A1 | 9/2002 | Gabelmann |
| 2006/0225798 A1 | 10/2006 | Bordonaro et al. |
| 2008/0223457 A1 | 9/2008 | Kobziar et al. |
| 2009/0032619 A1 | 2/2009 | Morgan et al. |
| 2011/0089361 A1 | 4/2011 | Renninger |
| 2011/0221261 A1 | 9/2011 | Eaton et al. |
| 2011/0272618 A1 | 11/2011 | Mosier et al. |
| 2011/0308637 A1 | 12/2011 | Tsiberidis |
| 2011/0315235 A1 | 12/2011 | Colefax et al. |
| 2012/0059546 A1 * | 3/2012 | Wilson .................. B60C 23/003 701/34.4 |
| 2012/0138826 A1 | 6/2012 | Morris et al. |
| 2014/0224399 A1 * | 8/2014 | Mozingo ............... B60C 23/003 152/417 |
| 2015/0020931 A1 | 1/2015 | Kawamura |
| 2015/0202931 A1 | 7/2015 | Honig |

FOREIGN PATENT DOCUMENTS

| | | |
|---|---|---|
| DE | 102008062072 | 6/2010 |
| DE | 102008062072 A1 | 6/2010 |
| EP | 0164916 | 12/1985 |
| EP | 0206949 A1 | 12/1986 |
| EP | 0206949 A1 | 12/1986 |
| EP | 2522532 | 11/2012 |
| EP | 2522532 A1 | 11/2012 |
| FR | 1432885 | 3/1966 |
| FR | 1432885 A | 3/1966 |
| FR | 2149276 | 3/1973 |
| FR | 2149276 A1 | 3/1973 |
| FR | 2619762 | 3/1989 |
| FR | 2619762 A1 | 3/1989 |
| GB | 410531 | 5/1934 |
| GB | 410531 A | 5/1934 |
| GB | 646891 | 11/1950 |
| GB | 646891 A | 11/1950 |
| GB | 1037494 | 7/1966 |
| GB | 1037494 A | 7/1966 |
| GB | 1346130 | 2/1974 |
| GB | 1346130 A | 2/1974 |
| GB | 2262921 | 7/1993 |
| GB | 2262921 A | 7/1993 |
| GB | 2312268 | 10/1997 |
| GB | 2312268 A | 10/1997 |
| GB | 2348268 | 9/2000 |
| GB | 2348268 A | 9/2000 |
| WO | 9114120 | 9/1991 |
| WO | 9114120 A1 | 9/1991 |
| WO | 02062595 A1 | 8/2002 |
| WO | 2002062595 | 8/2002 |
| WO | 2004030952 | 4/2004 |
| WO | 2004030952 A1 | 4/2004 |
| WO | 2010094067 | 8/2010 |
| WO | 2010094067 A1 | 8/2010 |
| WO | 2011028346 | 3/2011 |
| WO | 2011028346 A1 | 3/2011 |
| WO | 2014028142 | 2/2014 |
| WO | 2014151418 | 9/2014 |
| WO | 2014151418 A1 | 9/2014 |

* cited by examiner

TIRE PRESSURE MANAGEMENT SYSTEM AND METHOD OF DECREASING TIRE
PRESSURE

CROSS-REFERENCE TO RELATED APPLICATION

This application is claiming the benefit, under 35 U.S. C. 119(a), of the U.S. patent application which was granted Ser. No. 62/242,408 and filed on Oct. 16, 2015, the entire disclosure of which is hereby incorporated by reference.

BACKGROUND OF THE INVENTION

The invention relates to a tire pressure management system. More particularly, the invention relates to a tire pressure management system and a method of decreasing tire pressure.

Certain types of vehicles such as, for example, commercial vehicles require that the tire pressure of their wheel assemblies be periodically adjusted for optimal performance. Tire pressure management systems such as, for example, central tire inflation systems can be utilized to manually and/or automatically adjust the tire pressure of one or more wheel assemblies. Typically, in order to determine when an adjustment is necessary and to avoid over inflation or under inflation, the tire pressure is measured. If, after measuring the tire pressure, it is determined that the tire pressure of a particular tire needs to be decreased, then the tire pressure management system enables the tire pressure decrease.

Current tire pressure management systems capable of decreasing tire pressure are expensive to manufacture and complex. Therefore, it would be desirable to provide a system and method which is less expensive and less complex than those known and that can decrease the tire pressure within a desired amount of time.

BRIEF SUMMARY OF THE INVENTION

Embodiments of a tire pressure management system are provided.

In an embodiment, the tire pressure management system comprises a control valve assembly. The control valve assembly directs pressurized air from a first fluid conduit when in a first position and provides fluid communication between a source of pressurized air and the first fluid conduit when in a second position. A deflate member is in fluid communication with the control valve assembly or the first fluid conduit. The deflate member comprises an orifice that has a constant cross-sectional area which is sized to maintain a predetermined pressure in a fluid control circuit.

In another embodiment, the tire pressure management system comprises a control valve assembly. The control valve assembly directs pressurized air from a first fluid conduit when in a first position and provides fluid communication between a source of pressurized air and the first fluid conduit when in a second position. A deflate member is in fluid communication with the control valve assembly. The deflate member comprises an orifice having a constant cross-sectional area of a curvilinear shape which is sized to maintain a predetermined pressure in a fluid control circuit. A wheel valve is in fluid communication with the fluid control circuit. A wheel assembly is in fluid communication with the wheel valve. The predetermined pressure is sufficient to maintain the wheel valve in an open position when a tire pressure of the wheel assembly is being decreased.

In yet another embodiment, the tire pressure management system comprises a deflate member. The deflate member comprises an orifice having a constant cross-sectional area of a curvilinear shape which is sized to maintain a predetermined pressure in a fluid control circuit. A control valve assembly is in fluid communication with the deflate member. In a first position, the control valve assembly directs pressurized air from a first fluid conduit to the deflate member. In a second position, the control valve assembly provides fluid communication between a source of pressurized air and the first fluid conduit. A supply valve assembly is attached to the first fluid conduit. The supply valve assembly prevents or provides fluid communication between the source of pressurized air and the first fluid conduit. A wheel valve is in fluid communication with the fluid control circuit and selectively in fluid communication with the control valve assembly and the supply valve assembly. A wheel assembly is in fluid communication with the wheel valve. The predetermined pressure is sufficient to maintain the wheel valve in an open position when a tire pressure of the wheel assembly is being decreased.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION OF THE INVENTION

Figure 1:
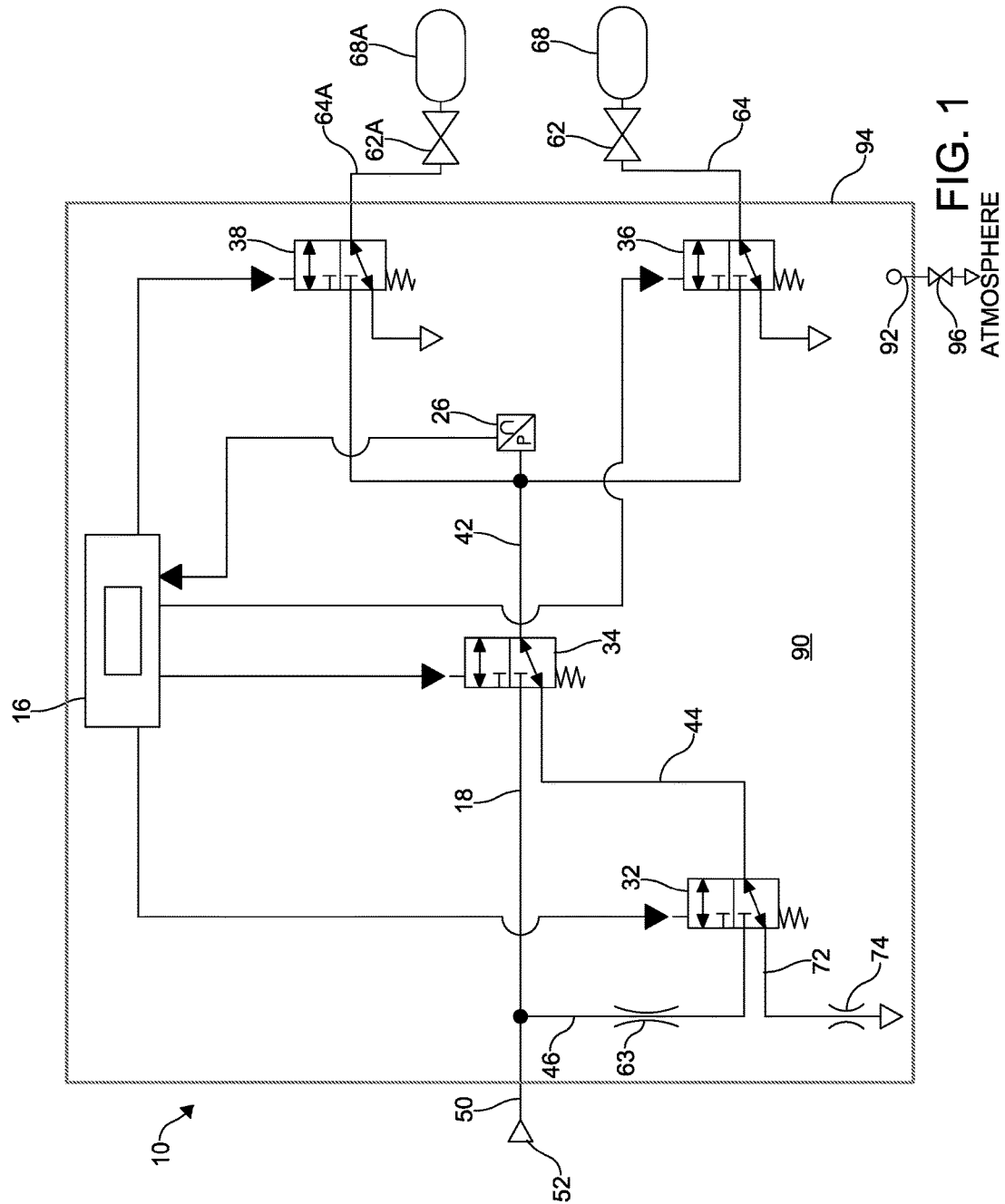
FIG. 1 is a schematic view of an embodiment of a tire pressure management system in accordance with the invention.

It is to be understood that the invention may assume various alternative orientations and step sequences, except where expressly specified to the contrary. It is also to be understood that the specific systems, assemblies, methods and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements found in the aforementioned embodiments may be referred to with like reference numerals within this section of the application.

Embodiments of a tire pressure management system 10, 10A, 10B, 10C, 10D and a method of decreasing tire pressure are described herein and are illustrated in FIGS. 1-9.

Preferably, the tire pressure management system 10, 10A, 10B, 10C, 10D is a central tire inflation system (CTIS). The tire pressure management system 10, 10A, 10B, 10C, 10D is provided on a vehicle (not depicted). A preferred type of vehicle is a commercial vehicle. Commercial vehicles are known in the art. However, the system and method described herein may also have applications in vehicles for both light and heavy duty and for passenger and off-highway vehicles. Furthermore, it would be understood by one of ordinary skill in the art that the system and method could have industrial, locomotive, military, and aerospace applications. Also, it should be appreciated that the system may be utilized and the method may be practiced prior to or during operation of the vehicle.

The tire pressure management system 10, 10A, 10B, 10C, 10D and method will be described in connection with a fluid. For the purposes of describing the system and method, the fluid will hereinafter be referred to as air. However, alternative fluids are capable of being utilized in the embodiments of the tire pressure management system and in practicing the method.

Pressurized air housed within a wheel assembly will be referred to herein as "tire pressure." Preferably, the tire pressure is equal to a target tire pressure. The target tire pressure can be selected by an operator of the vehicle to be a desired pressure. The tire pressure management system 10, 10A, 10B, 10C, 10D may be utilized to maintain, increase and/or decrease the tire pressure of one or more wheel assemblies. Tire pressure is increased by adding pressurized air into the wheel assembly and decreased by removing air from the wheel assembly. Maintaining, increasing and/or decreasing tire pressure is advantageous as it may improve the fuel economy and increase the life of the tires of the vehicle.

To ascertain if the tire pressure is equal to the target tire pressure, the tire pressure is determined by the tire pressure management system 10, 10A, 10B, 10C, 10D. Preferably, the tire pressure management system 10, 10A, 10B, 10C, 10D is configured to enable determining the tire pressure of one or more wheel assemblies and, if needed, decreasing the tire pressure thereof. If it is determined that the tire pressure is less than the target tire pressure, the tire pressure can be increased by the tire pressure management system 10, 10A, 10B, 10C, 10D. If it is determined that the tire pressure is greater than the target tire pressure, the tire pressure can be decreased by the tire pressure management system 10, 10A, 10B, 10C, 10D. After the tire pressure has been increased and/or decreased, the tire pressure can be determined again as needed. Also, if the tire pressure is equal to the target tire pressure, the tire pressure can be determined again at a later time.

The tire pressure management system 10, 10A, 10B, 10C, 10D comprises an electronic control portion 16. After the target tire pressure is selected, it can be programmed into the electronic control portion 16. The target tire pressure can also be pre-programmed into the electronic control portion 16.

The electronic control portion 16 may include a microprocessor (not depicted) operating under the control of a set of programming instructions, which may also be referred to as software. The electronic control portion 16 may include a memory (not depicted) in which programming instructions are stored. The memory can also store identification codes, tire pressure records and/or user inputs over a period of time.

The electronic control portion 16 may receive input signals from a pressure sensor 26, power supply (not depicted), and one or more additional sensors (not depicted) such as, for example, a load sensor and a speed sensor. The load sensor and speed sensor may each be conventional in the art. The pressure sensor 26 may also be referred to as a pressure transducer and will be discussed in greater detail below.

The electronic control portion 16 may also receive input signals from an operator control device (not depicted). The operator control device may allow an operator of the vehicle to exert a certain level of control over the tire pressure management system 10, 10A, 10B, 10C, 10D. The operator control device may be conventional in the art. The operator control device permits an operator of the vehicle to transmit control signals to the electronic control portion 16 to adjust the tire pressure.

The electronic control portion 16 outputs signals to one or more members of a pneumatic control portion 18. Preferably, the electronic control portion 16 outputs signals to a plurality of valve assemblies 32, 34, 36, 38, 76 of the pneumatic control portion 18. The output signals may be electrical current. Electrical current can be received by a valve assembly 32, 34, 36, 38, 76 to energize the valve assembly, which may place the assembly in a desired position such as, for example, a first position, a second position, an open position, or a closed position. Similarly, electrical current can be removed from the valve assembly 32, 34, 36, 38, 76 to de-energize the valve assembly, which may place the assembly in another position such as, for example, the first position, the second position, the open position, or the closed position. The electronic control portion 16 may also output signals to a display device (not depicted). The display device may be included as a part of the operator control device (not depicted) or a freestanding device. The pneumatic control portion 18 may also comprise one or more conduits 42, 44, 46, 70, 72.

The tire pressure management system 10, 10A, 10B, 10C, 10D includes a source of pressurized air 52. Pressurized air is supplied from the source of pressurized air 52 via an air supply circuit 50. Preferably, the source of pressurized air 52 comprises a reservoir (not depicted) such as, for example, a wet tank. Preferably, an air compressor (not depicted) is attached to the vehicle and in fluid communication with the wet tank via a supply conduit (not depicted). The air compressor supplies pressurized air to the wet tank for storage therein. In certain embodiments, a drier (not depicted) is interposed in the air supply circuit 50 for removing water from the air. A filter (not depicted) may also be interposed in the air supply circuit 50.

The pressurized air from the source of pressurized air 52 may be utilized to determine the tire pressure and, if needed, open one or more wheel valves 62, 62A and increase the tire pressure. The pressurized air provided in the air supply circuit 50 and supplied from the source of pressurized air 52 comprises air at a certain pressure. The pressure sensor 26 measures the pressure of the pressurized air provided in the air supply circuit 50. It is preferred that the pressurized air provided in the air supply circuit 50 is at a pressure which is greater than the tire pressure. Preferably, the pressure of the pressurized air provided in the air supply circuit 50 is greater than the target tire pressure so that the tire pressure can, if needed, be increased to the target tire pressure. In an embodiment, the pressure of the air provided in the air supply circuit 50 is equal to the target tire pressure plus 5 psig or more.

The air supply circuit 50 is in fluid communication with the control valve assembly 32 and the supply valve assembly 34. The control valve assembly 32 and the supply valve assembly 34 are each operable in a first position or a second position. Preferably, the control valve assembly 32 is normally in its first position and the supply valve assembly 34 is normally in its first position. Preferably, when the control valve assembly 32 is de-energized, the valve assembly 32 is in or placed in its first position. Preferably, when the supply valve assembly 34 is de-energized, the valve assembly 34 is in or placed in its first position. Preferably, when the control valve assembly 32 is energized, the valve assembly 32 is in or placed in its second position. Preferably, when the supply valve assembly 34 is energized, the valve assembly 34 is in or placed in its second position.

Figure 2:
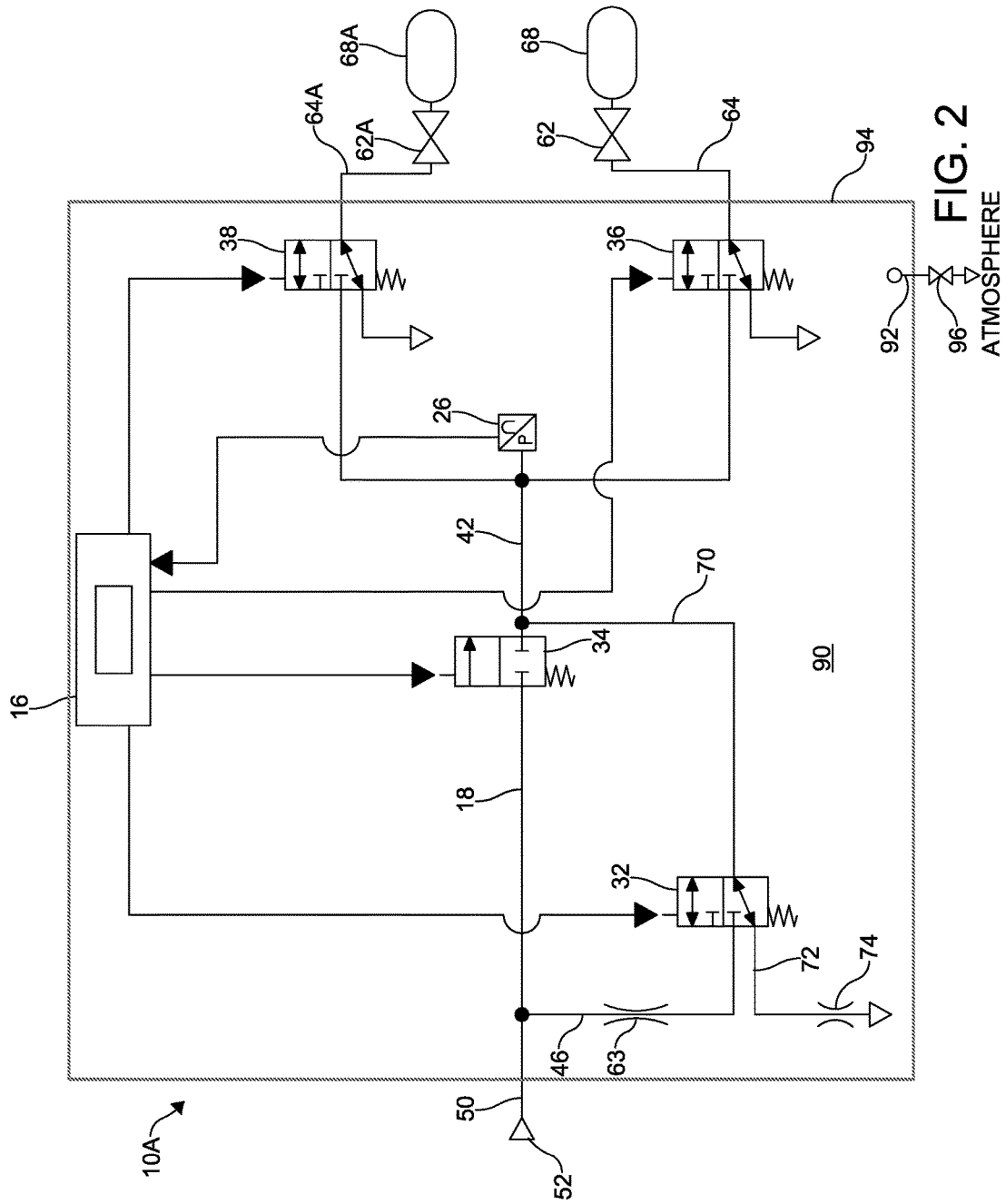
FIG. 2 is a schematic view of another embodiment of a tire pressure management system in accordance with the invention.
Figure 3:
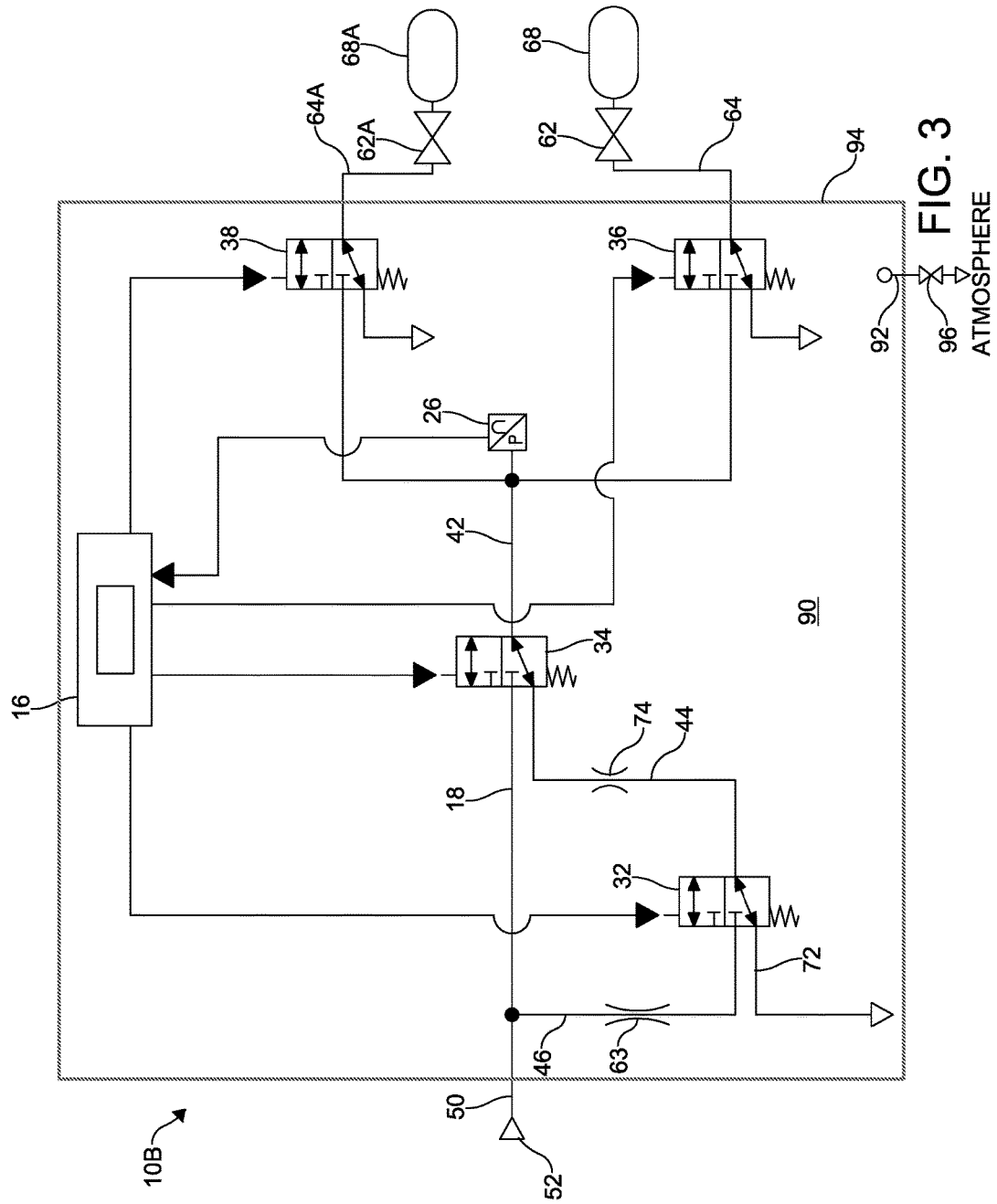
FIG. 3 is a schematic view of yet another embodiment of a tire pressure management system in accordance with the invention.
Figure 4:
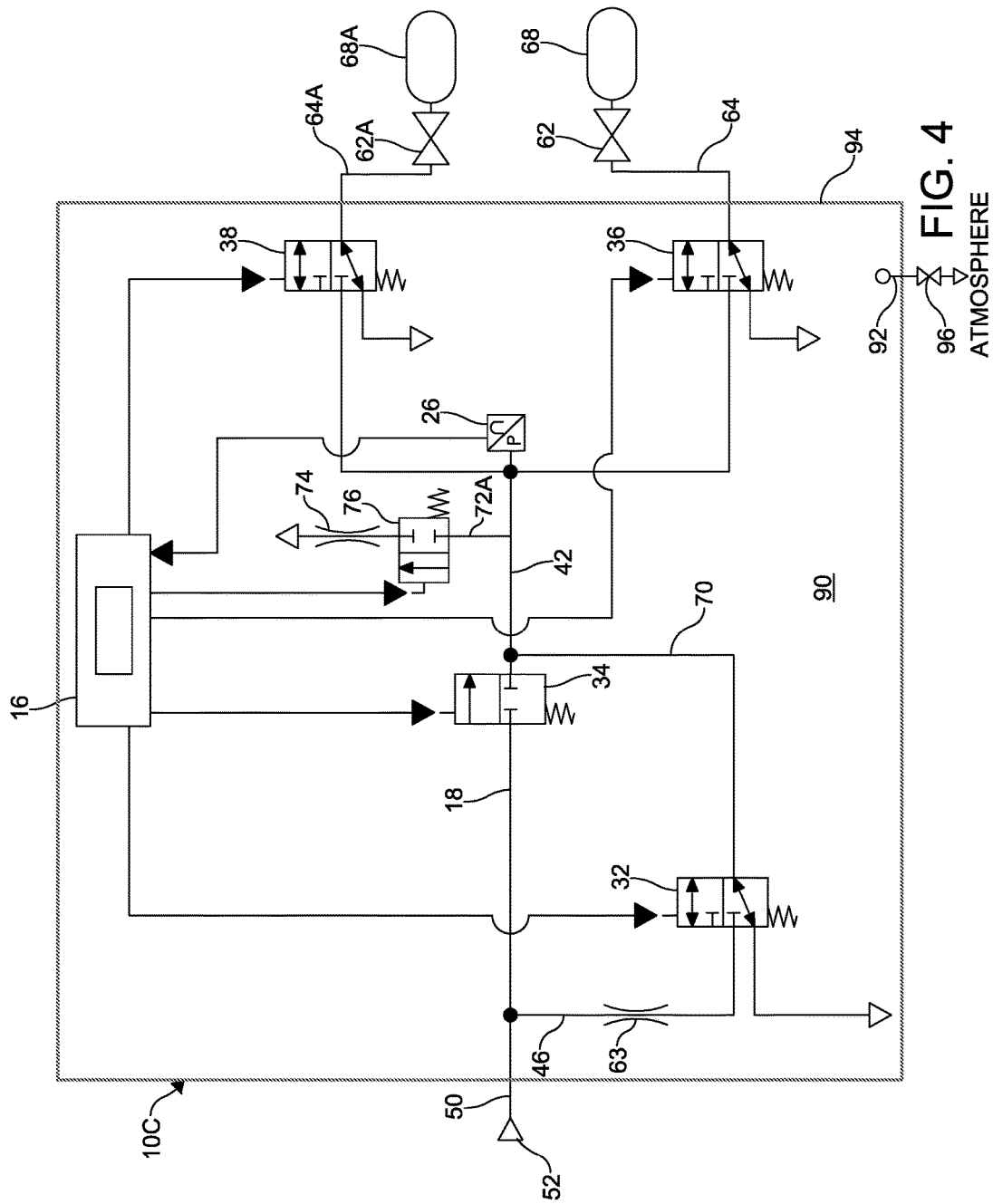
FIG. 4 is a schematic view of still another embodiment of a tire pressure management system in accordance with the invention.
Figure 5:
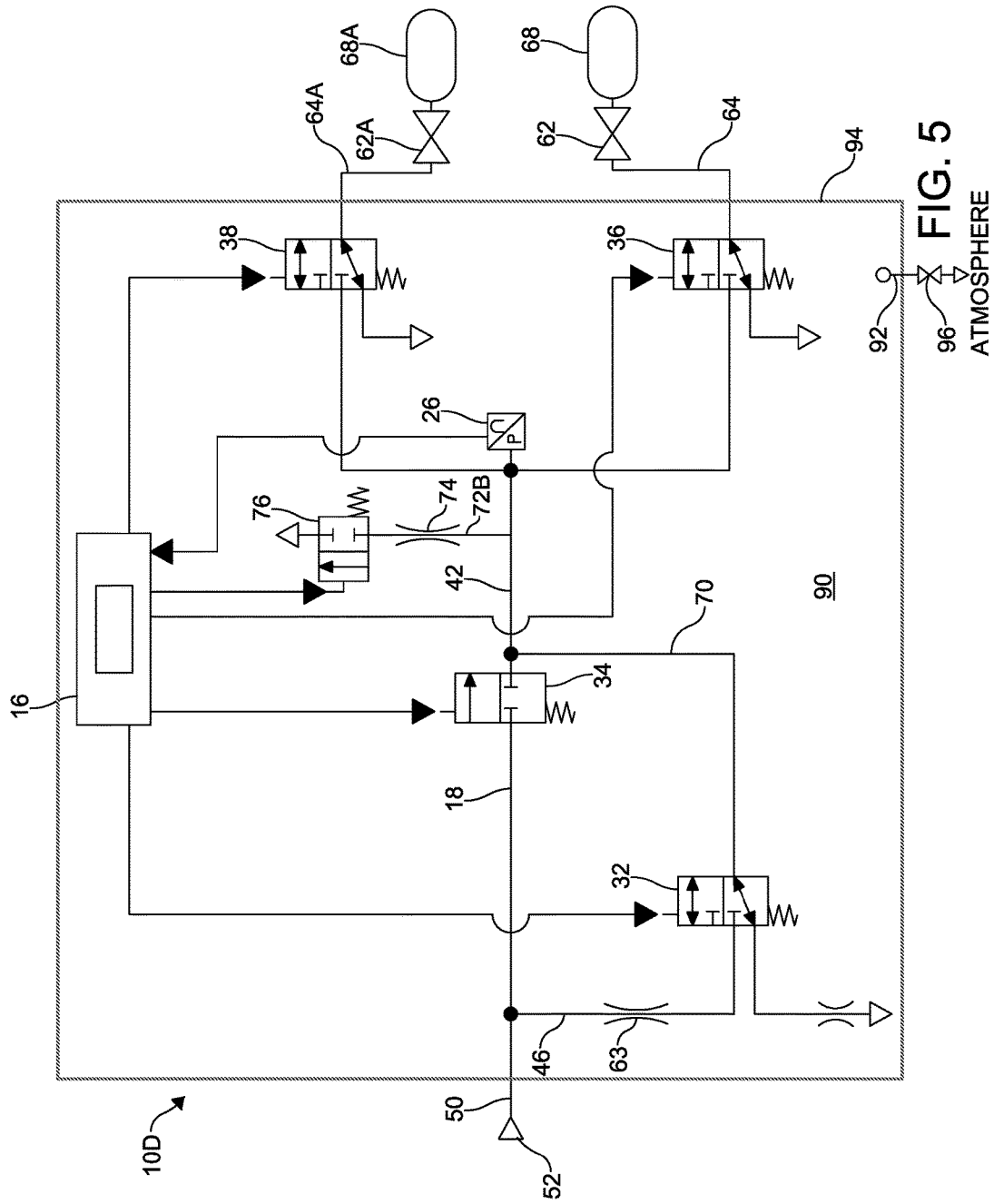
FIG. 5 is a schematic view of a further embodiment of a tire pressure management system in accordance with the invention.
Figure 6:
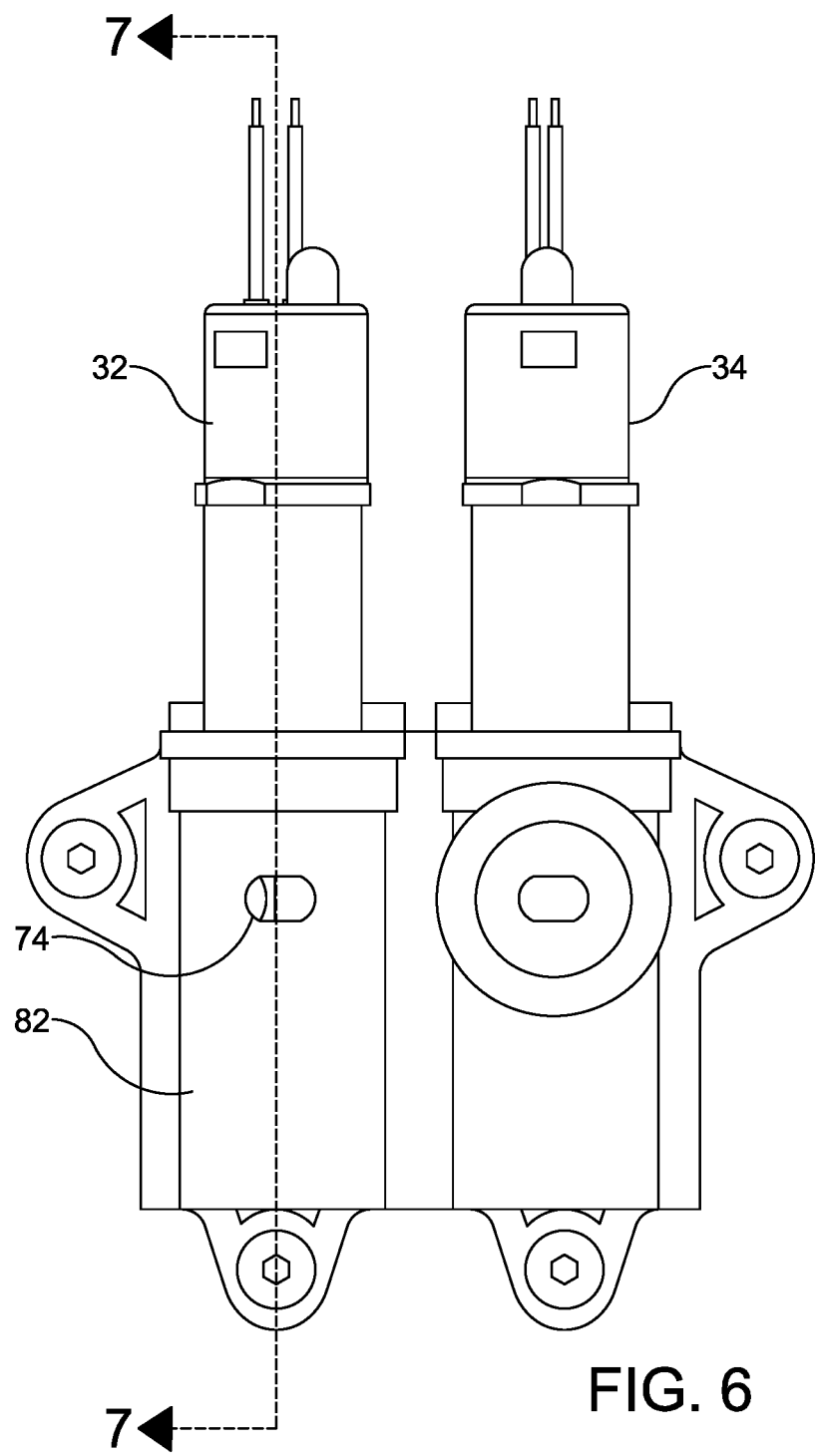
FIG. 6 is a front view of a portion of an embodiment of a tire pressure management system in accordance with the invention.
Figure 7:
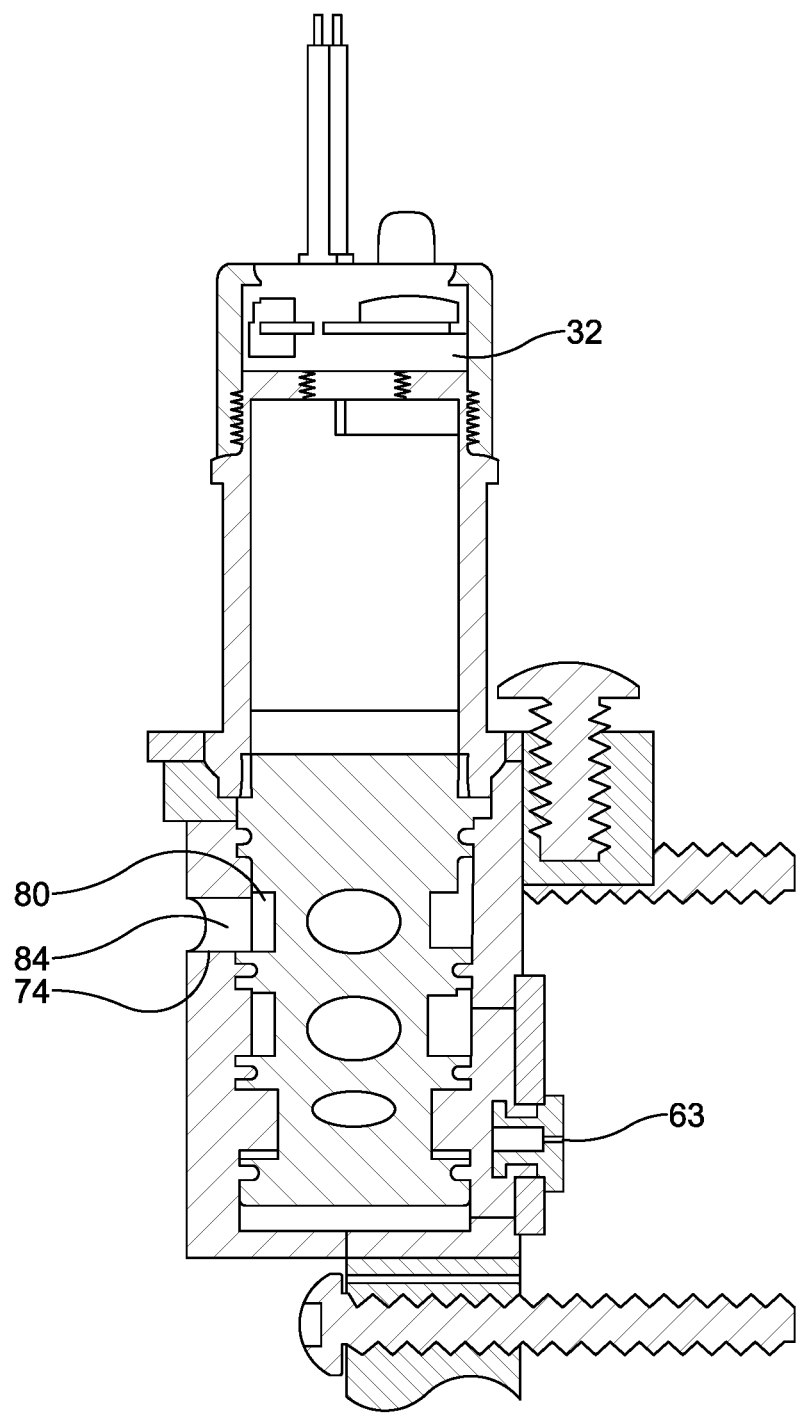
FIG. 7 is a cross-section view through the portion of the tire pressure management system of FIG. 6 along line 7-7.
Figure 8:
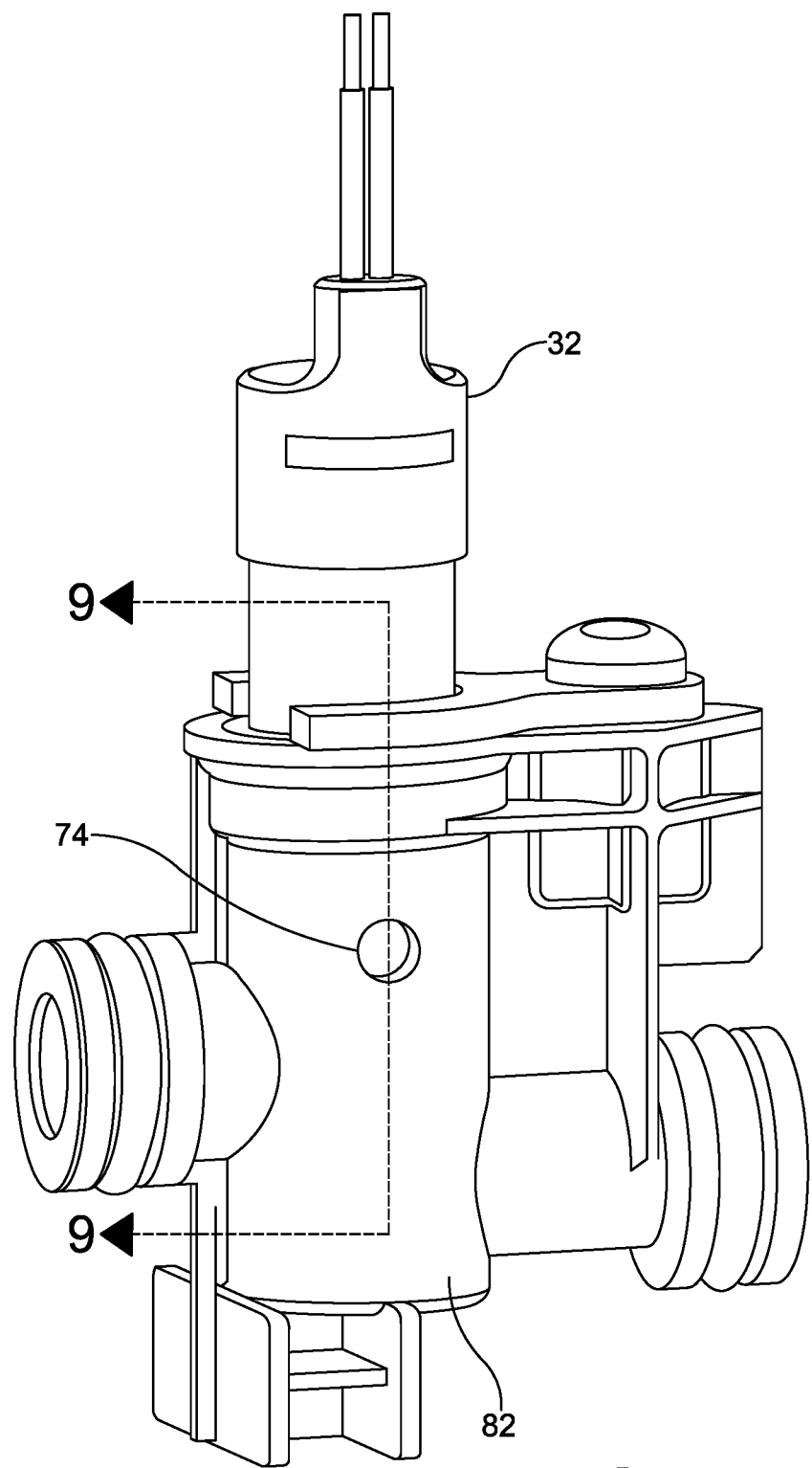
FIG. 8 is a front view of a portion of an embodiment of a tire pressure management system in accordance with the invention.
Figure 9:
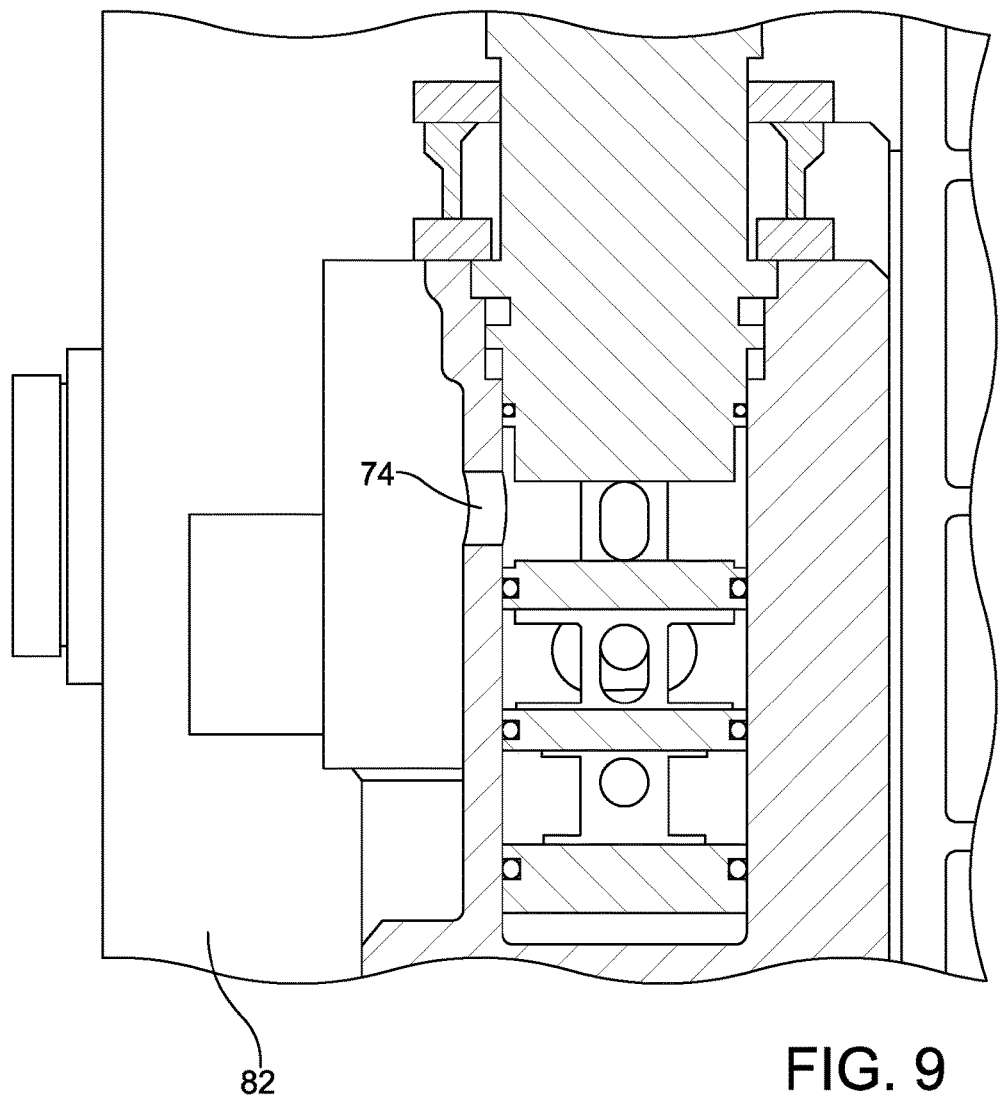
FIG. 9 is a cross-section view through the portion of the tire pressure management system of FIG. 8 along line 9-9.

In certain embodiments, the control valve assembly 32 and supply valve assembly 34 are each of the solenoid variety. In these embodiments, the control valve assembly 32 is preferably of the three-way variety. The supply valve assembly 34 may be of the two-way variety, which is illustrated in FIGS. 2 and 4-5, or the three-way variety, which is illustrated in FIGS. 1 and 3. In other embodiments, like the ones illustrated in FIGS. 6-7, the control valve assembly 32 and the supply valve assembly 34 may be provided as a unitized assembly. Embodiments of the unitized assembly suitable for use with in the tire pressure management system 10, 10A, 10B, 10C, 10D are described in PCT patent application serial no. PCT/US16/45765, the entire disclosure of which is hereby incorporated by reference.

The control valve assembly 32 is selectively in fluid communication with one or more wheel assemblies 68, 68A via the first fluid conduit 42, one or more fluid control circuits 64, 64A, and one or more wheel valves 62, 62A. When de-energized and/or in its first position, the control valve assembly 32 directs pressurized air from the first fluid conduit 42. As will be described below, the pressurized air from the first fluid conduit is directed to atmosphere via the control valve assembly 32. When energized and/or in its second position, the control valve assembly 32 directs pressurized air from the source of pressurized air 52 to the first fluid conduit 42.

An orifice 63 is provided upstream of and in fluid communication with the control valve assembly 32. In an embodiment, the orifice 63 may be provided within the control valve assembly 32 or may be in the control valve assembly portion of a unitized assembly. Preferably, the orifice 63 is provided in a fluid conduit 46. The fluid conduit 46 may be provided as a portion of the air supply circuit 50. When the control valve assembly 32 is in its second position, the orifice 63 is utilized to provide a small flow or bleed of pressurized air to the first fluid conduit 42 and/or another portion of the tire pressure management system 10, 10A, 10B, 10C, 10D such as one or more of the fluid control circuits 64, 64A. As will be described in more detail below, when the control valve assembly 32 is in its first position, the control valve assembly 32 may also be utilized to decrease the tire pressure of one or more wheel assemblies 68, 68A.

The supply valve assembly 34 is attached to the first fluid conduit 42. The supply valve assembly 34 is selectively in fluid communication with one or more wheel assemblies 68, 68A via the first fluid conduit 42, one or more fluid control circuits 64, 64A, and one or more wheel valves 62, 62A. The supply valve assembly 34 separates the source of pressurized air 52 from the first fluid conduit 42. When energized and/or in its second position, the supply valve assembly 32 provides fluid communication between the source of pressurized air 52 and the first fluid conduit 42 and directs pressurized air from the source of pressurized air 52 to the first fluid conduit 42. Thus, the supply valve assembly 34 may be utilized to communicate pressurized air to the first fluid conduit 42 and/or one or more of the fluid control circuits 64, 64A. In this embodiment, the pressurized air may be utilized to determine and/or increase the tire pressure of one or more wheel assemblies 68, 68A. When de-energized and/or in its first position, the supply valve assembly 32 may prevent fluid communication between the source of pressurized air 52 and the first fluid conduit 42. However, as illustrated by the embodiments depicted in FIGS. 1 and 3, in its first position, the supply valve assembly 34 may be utilized to direct pressurized air from one or more wheel assemblies 68, 68A to the control valve assembly 32 when the tire pressure of the one or more wheel assemblies 68, 68A is being decreased.

In an embodiment, like the one illustrated in FIG. 1, the central fluid conduit 44 is attached on opposite ends to the control valve assembly 32 and the supply valve assembly 34. In this embodiment, the central fluid conduit 44 is in fluid communication with the control valve assembly 32 on an end and the supply valve assembly 34 on an opposite end. The central fluid conduit 44 is utilized to direct pressurized air between the control valve assembly 32 and the supply valve assembly 34. For example, in the embodiment illustrated in FIG. 1, when the control valve assembly 32 is in the second position and the supply valve assembly 34 is in the first position, the source of pressurized air 52 is in fluid communication with the first fluid conduit 42 via the control valve assembly 32, central fluid conduit 44, and supply valve assembly 34. In the second position and in this embodiment, the control valve assembly 32 is utilized to communicate the bleed of air to the supply valve assembly 34, the first fluid conduit 42 and/or one or more fluid control circuits 64, 64A. Also, when the control valve assembly 32 is in the first position and the supply valve assembly 34 is in the first position, pressurized air in the first fluid conduit 42 can be communicated through the supply valve assembly 34 to the control valve assembly 32 via the central fluid conduit 44. In other embodiments, like the one illustrated in FIG. 2, the central fluid conduit is not provided. In these embodiments, the control valve assembly 32 is attached to a second fluid conduit 70, which is directly in fluid communication with the first fluid conduit 42. In these embodiments, when the control valve assembly 32 is in the second position, pressurized air is directed from the source of pressurized air 52 to the first fluid conduit 42 via the second fluid conduit 70.

When the control valve assembly 32 is in the first position, the first fluid conduit 42 may be in fluid communication with the atmosphere. When the first fluid conduit 42 is in fluid communication with the atmosphere and if pressurized air is within the first fluid conduit 42, the pressurized air is directed to the atmosphere. Pressurized air may be directed to the atmosphere from the first fluid conduit 42 when the tire pressure management system 10, 10A, 10B, 10C, 10D is being vented or when decreasing the tire pressure of one or more wheel assemblies 68, 68A. When the tire pressure management system 10, 10A, 10B, 10C, 10D is being vented, each channel valve assembly 36, 38 is in its first position.

In the embodiment illustrated in FIG. 1, the first fluid conduit 42 is vented by directing pressurized air to the atmosphere from the first fluid conduit 42 through the supply valve assembly 34, central fluid conduit 44, control valve assembly 32, a deflate conduit 72 and a deflate member 74 into a chamber 90 or, when a chamber is not provided, directly to the atmosphere. When decreasing the tire pressure utilizing the tire pressure management system 10 illustrated in FIG. 1, one or more of the channel valve assemblies 36, 38 is in its second position and pressurized air from one or more wheel assemblies 68, 68A is directed to the first fluid conduit 42 from one or more of the fluid control circuits 64, 64A. From the first fluid conduit 42, the pressurized air is directed through the supply valve assembly 34, central fluid conduit 44, control valve assembly 32, deflate conduit 72, and deflate member 74 to the atmosphere.

In the embodiment illustrated in FIG. 2, the first fluid conduit 42 is vented by directing pressurized air from the first fluid conduit 42 through the second fluid conduit 70, control valve assembly 32, deflate conduit 72 and deflate member 74 and to the atmosphere. Also, when decreasing the tire pressure utilizing the tire pressure management system 10A illustrated in FIG. 2, pressurized air from one or more wheel assemblies 68, 68A is directed to the first fluid conduit 42 and, from the first fluid conduit 42, the pressurized air is directed through the second fluid conduit 70, control valve assembly 32, deflate conduit 72 and deflate member 74 to the atmosphere.

The chamber 90 may be at least partially defined by the housing 94. The chamber 90 may be in fluid communication with the atmosphere via a vent conduit 92. The vent conduit 92 extends from the chamber 90 to an outer surface of the housing 94. After pressurized air is received in the chamber 90 from the first fluid conduit 42, the vent conduit 92 directs the pressurized air in the chamber 90 to the atmosphere. Preferably, the vent conduit 92 is formed in a lower portion of the housing 94 and extends in a downward direction. Forming the vent conduit 92 in the lower portion of the housing 94 and to extend in a downward direction helps to prevent dirt and debris from entering the housing 94.

In certain embodiments, a valve 96 is positioned in the vent conduit 92. Preferably, the valve 96 is of the check valve variety. The valve 96 may be formed of rubber or another elastomeric material. In these embodiments, the valve 96 allows pressurized air in the chamber 90 to be discharged to the atmosphere and prevents air from the atmosphere from entering the chamber via the passage 92. Thus, the valve 96 helps to prevent dirt and debris from entering the housing 94 via the passage 92.

As noted above, when the supply valve assembly 34 is in the second position, the source of pressurized air 52 is in fluid communication with the first fluid conduit 42. Under these conditions, the supply valve assembly 34 is utilized to communicate a flow of pressurized air from the source of pressurized air 52 to the first fluid conduit 42. Thus, the supply valve assembly 34 may be utilized to promote air flow from the source of pressurized air 52 directly to the first fluid conduit 42. In the first position, the supply valve assembly 34 prohibits pressurized air from flowing directly from the source of pressurized air 52 to the first fluid conduit 42. When in the first position and in an embodiment like the one illustrated in FIG. 1, the supply valve assembly 34 may be utilized to communicate a flow of pressurized air from the first fluid conduit 42 to the control valve assembly 32 or from the control valve assembly 32 to the first fluid conduit 42.

Also, as noted above for the embodiment illustrated in FIG. 1, when the control valve assembly 32 is in its second position and the supply valve assembly 34 is in its first position, the control valve assembly 32 and the supply valve assembly 34 are in fluid communication via the central fluid conduit 44. In this embodiment, pressurized air is directed from the source of pressurized air 52 to the first fluid conduit 42 via the supply valve assembly 34, central fluid conduit 44, and the control valve assembly 32. Also, as noted above, when the control valve assembly 32 is in its first position and the supply valve assembly 34 is in its first position and if pressurized air is in the first fluid conduit 42, the supply valve assembly 34 allows pressurized air to be directed from the first fluid conduit 42 to the control valve assembly 32 via the central fluid conduit 44. Additionally, when the control valve assembly 32 and the supply valve assembly 34 are positioned as described above, the source of pressurized air 52 is not in fluid communication with the first fluid conduit 42.

In the embodiments illustrated in FIGS. 1-2, the deflate conduit 72 may be attached on an end to the control valve assembly 32 and on an opposite end to the deflate member 74. In these embodiments, the deflate conduit 72 is in direct fluid communication with the control valve assembly 32 and the deflate member 74. Thus, the deflate member 74 is in fluid communication with the control valve assembly 32 via the deflate conduit 72, which enables fluid communication between the control valve assembly 32 and the deflate member 74 by directing pressurized air from the control valve assembly 32 to the deflate member 74. In other embodiments, like the one illustrated in FIG. 3, the deflate conduit 72 is attached on an end to the control valve assembly 32 and on an opposite end directs pressurized air from one or more of the wheel assemblies 68, 68A to the atmosphere via the chamber 90 and vent conduit 92 when tire pressure is being decreased. In the embodiment illustrated in FIG. 3, the deflate member 74 is attached to and in direct fluid communication with the central fluid conduit 44. In this embodiment, the deflate member 74 is in fluid communication with the control valve assembly 32 via the central fluid conduit, which enables fluid communication between the control valve assembly 32 and the deflate member 74 by directing pressurized air from the control valve assembly 32 to the deflate member 74 when the tire pressure is being measured and to the control valve assembly 32 from the deflate member 74 when the tire pressure is being decreased. Further, in this embodiment, when the control valve assembly 32 is in the first position, the deflate member 74 is in fluid communication with the deflate conduit 72 and, when the control valve assembly 32 is in the second position, the deflate member 74 is not in fluid communication with the deflate conduit 72. Thus, in this embodiment, the deflate member 74 is selectively in fluid communication with the deflate conduit 72. In still other embodiments like those illustrated in FIGS. 4-5, the deflate member 74 is in fluid communication with the first fluid conduit 42 via the deflate conduit 72A, 72B. In these embodiments, the deflate conduit 72A, 72B is in fluid communication with and attached directly on an end thereof to the first fluid conduit 42. In these embodiments and on an opposite end, the deflate conduit 72A, 72B is attached to a deflate valve assembly 76.

The deflate valve assembly 76 promotes or prohibits the flow of pressurized air from the deflate conduit 72A, 72B to the atmosphere. The deflate valve assembly 76 is operable from a first position to a second position and vice versa. In the first position, the deflate valve assembly 76 prohibits the flow of pressurized air from the deflate conduit 72A, 72B to the atmosphere. In the second position, the deflate valve assembly 76 promotes the flow of pressurized air from the deflate conduit 72A, 72B to the atmosphere. Preferably, the deflate valve assembly 76 is normally in the first position. The deflate valve assembly 76 may be of the solenoid variety. Preferably, when the deflate valve assembly 76 is of the solenoid variety, the deflate valve assembly 76 is in the first position when it is de-energized. Also, it is preferred that when the deflate valve assembly 76 is of the solenoid variety, the deflate valve assembly 76 is in the second position when it is energized. In the embodiments illustrated in FIG. 4 and FIG. 5, the deflate valve assembly 76 acts as a blocking valve and is preferably of the two-way variety.

The deflate member 74 is utilized to decrease the tire pressure of one or more wheel assemblies 68, 68A. To decrease the tire pressure of one or more wheel assemblies 68, 68A, the deflate member 74 is configured to provide a predetermined flow rate of pressurized air and/or to provide a desired pressure in another portion of the tire pressure management system 10, 10A, 10B, 10C, 10D. Because of the relative location in which it is provided, the pressure provided in the tire pressure management system 10, 10A, 10B, 10C, 10D by the deflate member may be referred to herein as "back pressure." The back pressure generated by utilizing the deflate member 74 is sufficient to maintain one or more wheel valves 62, 62A in an open position while the tire pressure of one or more wheel assemblies 68, 68A is being decreased. Preferably, the back pressure is provided in a predetermined portion of one or more of the fluid control circuits 64, 64A adjacent one or more wheel valves 62, 62A. Providing a predetermined flowrate of pressurized air through the deflate member and/or a desired back pressure in the predetermined portion of the tire pressure management system 10 allows for a desired decrease in tire pressure within a predetermined period of time.

As noted above, in certain embodiments, the deflate member 74 is attached to an end of the deflate conduit 72, 72A. In other embodiments, like the one illustrated in in FIG. 3, the deflate member 74 may be provided in the central fluid conduit 44. In still other embodiments, like the one illustrated in FIG. 5, the deflate member 74 may be provided in the deflate conduit 72B. In still further embodiments, like the one illustrated in FIGS. 6 and 7, the deflate member 74 may be provided as a portion of the control valve assembly 32. In these embodiments, the deflate member 74 is formed in a unitary manner with the control valve assembly 32. More particularly, the deflate member 74 may be formed in a unitary manner with a housing 82 of the control valve assembly 32 and is in direct fluid communication with a chamber portion 80 of the control valve assembly 32. It should also be noted that, in the embodiments shown in FIGS. 6 and 7, a deflate conduit is not provided in the tire pressure management system.

The deflate member 74 includes an orifice 84. When tire pressure is being decreased, pressurized air from one or more wheel assemblies 68 passes through the deflate member 74 and the orifice 84. The orifice 84 has a cross-sectional area which is of a size that is selected to provide a predetermined flowrate of pressurized air through the deflate member 74. The size of the orifice's cross-sectional area is also selected to provide the desired back pressure in the fluid control circuit 64, 64A as described above. Providing the predetermined flowrate of pressurized air and/or the desired back pressure maintains the wheel valve 62, 62A in an open position, which allows for the tire pressure to be decreased to a desired level.

As illustrated best in FIGS. 6-9, the size of the cross-sectional area of the orifice 84 is constant and predetermined. Preferably, the orifice's cross-sectional area is smaller than a cross-sectional area of the deflate conduit 72, 72A. In the embodiments illustrated in FIGS. 6-9, the deflate member 74 is formed of a sufficiently rigid material to ensure that the size and shape of the area remain constant. For example, the deflate member 74 may be formed from a rigid polymeric material. In other embodiments, the deflate member 74 may be a valve assembly.

Preferably, the cross-sectional area of the orifice 84 is of a curvilinear shape. For example, in an embodiment like the one illustrated in FIGS. 6-7, the cross-sectional area of the orifice 84 is of an oval shape. In other embodiments, like the one illustrated in FIGS. 8-9, the cross-sectional area of the orifice 84 may be of another curvilinear shape such as, for example, a circular shape. In this embodiment, the cross-sectional area of the orifice 84 comprises a diameter. In still other embodiments, the area may be of another geometric shape.

The pressure sensor 26 measures the pressure of the air within the first fluid conduit 42. When the source of pressurized air 52 is in fluid communication with the first fluid conduit 42, the pressure sensor 26 can measure the pressure of the air from the source of pressurized air 52 by measuring the pressure of the air in the first fluid conduit 42. Also, during certain operations, the pressure sensor 26 may measure the tire pressure by measuring the pressure of the air in the first fluid conduit 42. Measuring the pressure of the air in the first fluid conduit 42 allows the pressure sensor 26 to send signals to the electronic control portion 16 related to the pressure in the first fluid conduit 42.

As described above and illustrated in FIGS. 1-5, the first fluid conduit 42 is in fluid communication with the pressure sensor 26 and the supply valve assembly 34. As described above and illustrated in FIGS. 2, 4 and 5, the first fluid conduit 42 may also be in fluid communication with the control valve assembly 36 via the second fluid conduit 70. The first fluid conduit 42 is also attached to and in fluid communication with one or more channel valve assemblies 36, 38.

Each channel valve assembly 36, 38 is provided as a portion of the pneumatic control portion 18. Each channel valve assembly 36, 38 may be utilized to prevent or promote flow of pressurized air to an associated fluid control circuit 64, 64A. Preferably, each channel valve assembly 36, 38 is of the solenoid variety. Also, it is preferred that each channel valve assembly 36, 38 is operable from a first position or a second position. Preferably, when a channel valve assembly 36, 38 is of the solenoid variety, the channel valve assembly 36, 38 is in the first position when it is de-energized. Also, it is preferred that when the channel valve assembly 36, 38 is of the solenoid variety, the channel valve assembly 36, 38 is in the second position when it is energized. Preferably, each channel valve assembly 36, 38 is normally in its first position.

Preferably, each channel valve assembly 36, 38 is similarly configured. It should be appreciated that when each channel valve assembly 36, 38 is similarly configured, the tire pressure management system 10, 10A, 10B, 10C, 10D can utilize each channel valve assembly 36, 38 in a similar fashion. In the embodiments illustrated, each channel valve assembly 36, 38 is of the three-way variety. Each channel valve assembly 36, 38 separates a fluid control circuit 64, 64A from the first fluid conduit 42. When a channel valve assembly 36, 38 is in its second position, the first fluid conduit 42 is in fluid communication with the fluid control circuit 64, 64A associated with the channel valve assembly 36, 38.

Preferably, each fluid control circuit 64, 64A is selectively in fluid communication with one or more wheel assemblies 68, 68A of the vehicle. When the first fluid conduit 42 is in fluid communication with at least one of the fluid control circuits 64, 64A, a flow of pressurized air from the source of pressurized air 52 can be directed to a wheel assembly 68, 68A via the fluid control circuit 64,64A and an associated wheel valve 62, 62A. Thus, when a channel valve assembly 36, 38 is in its second position, the channel valve assembly 36, 38 is utilized to promote pressurized air flow from the source of pressurized air 52 to one or more wheel assemblies 68, 68A as described above. When a channel valve assembly 36, 38 is in its first position, the associated fluid control circuit 64, 64A is in fluid communication with the atmosphere. When a fluid control circuit 64, 64A is in fluid communication with the atmosphere and if pressurized air is within the fluid control circuit 64, 64A venting the fluid control circuit 64, 64A occurs. A fluid control circuit 64, 64A is vented by directing pressurized air from the fluid control circuit 64, 64A through the associated channel valve assembly 36, 38 to the atmosphere.

Preferably, each fluid control circuit 64, 64A is similarly configured. It should be appreciated that when the first fluid control circuit 64 and the second fluid control circuit 64A are similarly configured, the tire pressure management system 10, 10A, 10B, 10C, 10D can utilize the fluid control circuits 64, 64A in similar fashions. For example, as described above, each fluid control circuit 64, 64A can be utilized to provide fluid communication between one or more wheel assemblies 68, 68A and portions of the pneumatic control portion 18. Also, as described above, both the first fluid control circuit 64 and the second fluid control circuit 64A may be vented, either separately or simultaneously. Thus, certain operations of the tire pressure management system 10, 10A, 10B, 10C, 10D will only be described with respect to the first fluid control circuit 64. It should be appreciated that the tire pressure management system 10, 10A, 10B, 10C, 10D is not limited to utilizing only the first fluid control circuit 64 as described below in performing the operations described herein.

As described above, each fluid control circuit 64, 64A is in fluid communication with one or more wheel valves 62, 62A. Preferably, each wheel valve 62, 62A is similarly configured and operates in a similar fashion. As such, the configuration and operation of only the first wheel valve 62 will be described below.

The first wheel valve 62 is attached to and in fluid communication with the first wheel assembly 68. In an embodiment, the first wheel valve 62 is as described in WO2014/028142, the entire disclosure of which is hereby incorporated by reference. The first wheel valve 62 separates the fluid control circuit 64 from the first wheel assembly 68 and is utilized to retain pressurized air in wheel assembly 68. Also, the first wheel valve 62 allows the first wheel assembly 68 to selectively communicate with the pneumatic control portion 18 via the first fluid control circuit 64. The first wheel valve 62 is operable from an open position to a closed position. In an open position, the first wheel valve 62 permits the tire pressure to be measured, increased, or decreased.

As noted above, the tire pressure is increased by adding pressurized air into a wheel assembly 68, 68A. The tire pressure of a plurality of wheel assemblies 68, 68A can be increased simultaneously to the target tire pressure. When a tire pressure is to be increased or decreased, the appropriate wheel valve 62, 62A is urged to an open position. It should be appreciated that a wheel valve 62, 62A may be urged to an open position utilizing a variety of methods. For example, a desired wheel valve 62, 62A may be urged to an open position via one or more pulses of pressurized air. A wheel valve 62, 62A may also be urged to the closed position when desired such as, for example, after the tire pressure has been increased or decreased to the target tire pressure.

As an example, when the first wheel valve 62 is in the open position, the tire pressure of the first wheel assembly 68 can be increased by any number of methods. In an embodiment, the tire pressure can be increased by utilizing one or more pulses of pressurized air. A pulse of air can be provided to the first wheel assembly 68 by placing the air supply circuit 50 in fluid communication with the first fluid control circuit 64 for a predetermined period of time and, at the end of the predetermined period of time, terminating fluid communication between the air supply circuit 50 and the first fluid control circuit 64. In this embodiment, the air supply circuit 50 is in fluid communication with the first fluid control circuit 64 when the control valve assembly 32, the supply valve assembly 34 and the first channel valve assembly 36 are in their respective second positions. Utilizing one or more pulses of pressurized air to increase the tire pressure helps to prevent over inflation of the first wheel assembly 68.

Once open, the first wheel valve 62 can be maintained in the open position for one or more predetermined periods of time to increase the tire pressure of the first wheel assembly 68 to the target tire pressure. The first wheel valve 62 can be maintained in the open position utilizing the bleed air. After the tire pressure has been increased to the target tire pressure, the first wheel valve 62 is urged to the closed position.

Alternatively, once the first wheel valve 62 is in the open position, the tire pressure of the first wheel assembly 68 can be decreased. The first wheel valve 62 can be maintained in the open position while the tire pressure is being decreased by providing a predetermined back pressure in an area of the first fluid control circuit 64 that is adjacent the first wheel valve 62 as pressurized air flows through the deflate member 74. After the tire pressure has been decreased to the target tire pressure, the first wheel valve 62 is urged to the closed position.

Decreasing the tire pressure will be described below primarily with reference to the tire pressure of one wheel assembly 68. However, the method is suitable for use in decreasing the tire pressure of two or more wheel assemblies 68, 68A simultaneously. Additionally, the method of decreasing tire pressure will be described for use with the first fluid control circuit 64. However, it should be appreciated that the method can be practiced in a similar manner with the second fluid control circuit 64A.

In order to decrease tire pressure of the first wheel assembly 68 in the embodiments illustrated in FIGS. 1-3, the control valve assembly 32 is in or is placed in its first position and the supply valve assembly 34 is in or is placed in its first position. In the embodiment illustrated in FIG. 1, when the control valve assembly 32 is in its first position and the supply valve assembly 34 is in its first position, the valve assemblies 32, 34 are in fluid communication with each other via the central fluid conduit 44. Also, the first channel valve assembly 36 is in or is placed in its second position. With the first wheel valve 62 in the open position and the valve assemblies 32, 34, 36 as described above, a stream of pressurized air is directed from the first wheel assembly 68 through the first wheel valve 62, fluid control circuit 64, first channel valve assembly 36, first fluid conduit 42, supply valve assembly 34, central fluid conduit 44, control valve assembly 32, and the deflate conduit 72 to the deflate member 74. Alternatively, as illustrated in the embodiment depicted in FIG. 2, the stream of pressurized air can be directed from the first wheel assembly 68 through the first wheel valve 62, first fluid control circuit 64, first channel valve assembly 36, first fluid conduit 42, second fluid conduit 70, control valve assembly 32, and the deflate conduit 72 to the deflate member 74. From the deflate member 74, the stream of pressurized air is directed directly to the atmosphere or to the atmosphere via the chamber 90. In the embodiment illustrated in FIG. 3, when the control valve assembly 32 is in the first position and the supply valve assembly 34 is in the first position, the valve assemblies 32, 34 are in fluid communication with each other via the central fluid conduit 44. Also, in this embodiment, the first channel valve assembly 36 is in or is placed in its second position. With the first wheel valve 62 in the open position and the valve assemblies 32, 34, 36 as described, a stream of pressurized air is directed from the first wheel assembly 68 through the first wheel valve 62, fluid control circuit 64, the first channel valve assembly 36, first fluid conduit 42, supply valve assembly 34, and the central fluid conduit 44 to the deflate member 74. From the deflate member 74, the pressurized air is directed to the atmosphere via the control valve assembly 32, deflate conduit 72, and the chamber 90.

In order to decrease the tire pressure of the first wheel assembly 68 in the embodiments illustrated in FIGS. 4-5, the supply valve assembly 34 is in or is placed in its first position and the control valve assembly 32 is placed in its second position. Also, the first channel valve assembly 36 is in or is placed in its second position. With the first wheel valve 62 in the open position and the valve assemblies 32, 34, 36 as described above, a stream of pressurized air is directed from the first wheel assembly 68 through the first wheel valve 62, first fluid control circuit 64, first channel valve assembly 36, and the first fluid conduit 42 to the deflate conduit 72A, 72B. As illustrated in FIG. 4, from the deflate conduit 72A, the stream of pressurized air is directed through the deflate valve assembly 76 to the deflate member 74 and to the atmosphere via the chamber 90. Alternatively, as illustrated in the embodiment depicted in FIG. 5, the stream of pressurized air may be directed from the deflate conduit 72B, through the deflate member 74, and to the deflate valve assembly 76. From the deflate valve assembly 76, the stream of pressurized air is directed to the atmosphere via the chamber 90.

The first wheel valve 62 is maintained in the open position as the tire pressure is decreased. The flow through the deflate member 74 is controlled so that the desired back pressure required in the fluid control circuit 64 to maintain the first wheel valve 62 in the open position can be provided. In an embodiment, pressurized air is removed from the first wheel assembly 68 for a predetermined amount of time in order for the target tire pressure to be achieved. Alternatively, in another embodiment, as pressurized air is being removed from the first wheel assembly 68, the pressure sensor 26 can measure a pressure of the air in the first fluid conduit 42 and provide a signal which corresponds to the tire pressure. If the pressure measured by the pressure sensor 26 is greater than the target tire pressure, the tire pressure can be decreased until the tire pressure is equal to the target tire pressure.

In other embodiments, the method may comprise decreasing a plurality of tire pressures simultaneously. In these embodiments, it is preferred that the tire pressures of the plurality of wheel assemblies 68, 68A are equalized before decreasing the tire pressures to the target tire pressure. Preferably, the tire pressures are equalized by decreasing the tire pressure of the wheel assembly 68, 68A having the highest tire pressure so that the tire pressure is equal to or about equal to the tire pressure of the wheel assembly 68, 68A having the lowest tire pressure. The step of decreasing the tire pressure of the wheel assembly 68, 68A having the highest tire pressure to be equal to or about equal to the tire pressure of the wheel assembly 68, 68A having the lowest tire pressure can be repeated as required until the tire pressures of the wheel assemblies 68, 68A are equal to each other. Once the tire pressures are equal or about equal, the tire pressures can be decreased to the target tire pressure by opening the appropriate wheel valves 62, 62A simultaneously utilizing the steps described above and directing pressurized air from the wheel assemblies 68, 68A to the deflate member 74.

If the pressure sensor 26 measures a pressure in the first fluid conduit 42 indicative of the tire pressure and that pressure is equal to the target tire pressure, decreasing the tire pressure is completed. Once decreasing the tire pressure is complete, one or more of the channel valve assemblies 36, 38 is placed into its first position. When a channel valve assembly 36, 38 is in its first position, the wheel valves 62, 62A in fluid communication the channel valve assembly 36, 38 are closed. With the wheel valves 62, 62A closed, further decreases in tire pressure are prevented as additional air is prevented from being removed from the wheel assembly 68, 68A.

Also, when the tire pressure is measured and is determined to be equal to the target tire pressure, venting the system 10, 10A, 10B, 10C, 10D may be desirable. Additionally, it may be desirable to vent the system 10, 10A, 10B, 10C, 10D if communication or power is lost to the system 10, 10A, 10B, 10C, 10D. Preferably, the tire pressure management system 10, 10A, 10B, 10C, 10B is vented by removing pressurized air one or more portions of the system. For example, it is preferably that any pressurized air within the first fluid conduit 42, the first fluid control circuit 64 and the second fluid control circuit 64A is removed once the tire pressure is equal to the target tire pressure.

As described above, pressurized air from the first fluid conduit 42, the first fluid control circuit 64 and/or the second fluid control circuit 64A can be directed to the atmosphere via the control valve assembly 32, a channel valve assembly 36, 38, the deflate conduit 72 and the deflate member 74, respectively. When it is desired to vent the tire pressure management system 10, 10A, 10B, 10C, 10D the control valve assembly 32 is in its first position, the supply valve assembly 34 is in its first position, each channel valve assembly 36, 38 is in its first position, and the deflate valve assembly 76 (if provided) is in its first position. When the aforementioned valve assemblies 32, 34, 36, 38, 76 are as described above, venting the first fluid conduit 42, the first fluid control circuit 64, and the second fluid control circuit 64A is enabled. If pressurized air is within the first fluid conduit 42, the first fluid control circuit 64, or the second fluid control circuit 64A, then the pressurized air is directed to the atmosphere as described above via the control valve assembly 32 and one or more of the channel valve assemblies 36, 38. Preferably, pressurized air in the first fluid control circuit 64 and the second fluid control circuit 64A is directed to the atmosphere via the channel valve assemblies 36, 38 and the chamber 90. Additionally, when the tire pressure management systems 10, 10A, 10B illustrated in FIGS. 1-3 are vented, pressurized air in the first fluid conduit 42 is directed to the atmosphere via the control valve assembly 32, the deflate conduit 72, and the deflate member 74. As illustrated in the embodiments shown in FIGS. 1 and 3, prior to being directed to the atmosphere, the pressurized air in the first fluid conduit 42 is directed to the control valve assembly 32 from the central fluid conduit 44 and supply valve assembly 34.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A tire pressure management system, comprising:
a control valve assembly, the control valve assembly directing pressurized air from a first fluid conduit when in a first position and providing fluid communication between a source of pressurized air and the first fluid conduit when in a second position;
a deflate member in fluid communication and formed in a unitary manner with the control valve assembly, the deflate member comprising an orifice having a constant cross-sectional area which is sized to maintain a predetermined pressure in a fluid control circuit.

2. The tire pressure management system of claim 1, further comprising a wheel valve in fluid communication with a wheel assembly, wherein the predetermined pressure is sufficient to maintain the wheel valve in an open position when a tire pressure of the wheel assembly is being decreased.

3. The tire pressure management system of claim 1, further comprising a deflate conduit attached to and in fluid communication with the control valve assembly and in fluid communication with the deflate member.

4. The tire pressure management system of claim 3, wherein the deflate member is in fluid communication with the control valve assembly via the deflate conduit.

5. The tire pressure management system of claim 3, wherein the deflate member is in fluid communication with the first fluid conduit via the deflate conduit.

6. The tire pressure management system of claim 3, wherein the cross-sectional area of the deflate member orifice is smaller than a cross-sectional area of the deflate conduit.

7. The tire pressure management system of claim 3, wherein the deflate member is attached to and in direct fluid communication with the deflate conduit.

8. The tire pressure management system of claim 3, wherein the deflate member is selectively in fluid communication with the deflate conduit.

9. The tire pressure management system of claim 8, wherein the deflate member is attached to and in fluid communication with the central fluid conduit.

10. The tire pressure management system of claim 1, wherein the cross-sectional area of the deflate member orifice is of a circular shape.

11. The tire pressure management system of claim 1, further comprising a supply valve assembly attached to the first fluid conduit, the supply valve assembly preventing or providing fluid communication between a source of pressurized air and the first fluid conduit.

12. The tire pressure management system of claim 11, wherein, when the control valve assembly is in the second position, pressurized air is directed from the source of pressurized air to the first fluid conduit via the supply valve assembly and a central fluid conduit, the central fluid conduit being in fluid communication with the control valve assembly on an end and the supply valve assembly on an opposite end.

13. The tire pressure management system of claim 1, further comprising a channel valve assembly which separates the fluid control circuit from the first fluid conduit.

14. The tire pressure management system of claim 1, wherein, when the control valve assembly is in the second position, pressurized air is directed from the source of pressurized air to the first fluid conduit via a second fluid conduit.

15. A tire pressure management system, comprising:
a control valve assembly, the control valve assembly directing pressurized air from a first fluid conduit when in a first position and providing fluid communication between a source of pressurized air and the first fluid conduit when in a second position;
a deflate member in fluid communication with the control valve assembly, the deflate member comprising an orifice having a constant cross-sectional area of a curvilinear shape which is sized to maintain a predetermined pressure in a fluid control circuit;
a wheel valve in fluid communication with the fluid control circuit; and
a wheel assembly in fluid communication with the wheel valve, wherein the predetermined pressure is sufficient to maintain the wheel valve in an open position when a tire pressure of the wheel assembly is being decreased.

16. The tire pressure management system of claim 15, further comprising a supply valve assembly attached to the first fluid conduit, the supply valve assembly preventing or providing fluid communication between a source of pressurized air and the first fluid conduit.

17. A tire pressure management system, comprising:
a deflate member comprising an orifice having a constant cross-sectional area of a curvilinear shape which is sized to maintain a predetermined pressure in a fluid control circuit;
a control valve assembly in fluid communication with the deflate member, where, in a first position, the control valve assembly directs pressurized air from a first fluid conduit to the deflate member and, in a second position, provides fluid communication between a source of pressurized air and the first fluid conduit;
a supply valve assembly attached to the first fluid conduit, the supply valve assembly preventing or providing fluid communication between the source of pressurized air and the first fluid conduit;
a wheel valve in fluid communication with the fluid control circuit and selectively in fluid communication with the control valve assembly and the supply valve assembly; and
a wheel assembly in fluid communication with the wheel valve, wherein the predetermined pressure is sufficient to maintain the wheel valve in an open position when a tire pressure of the wheel assembly is being decreased.

* * * * *